United States Patent [19]

Solarek et al.

[11] Patent Number: 4,731,162

[45] Date of Patent: Mar. 15, 1988

[54] POLYSACCHARIDE DERIVATIVES CONTAINING ALDEHYDE GROUPS FOR USE AS PAPER ADDITIVES

[75] Inventors: Daniel B. Solarek, Somerville; Patrick G. Jobe, Westfield; Martin M. Tessler, Edison, all of N.J.

[73] Assignee: National Starch and Chemical Corporation, Bridgewater, N.J.

[21] Appl. No.: 32,266

[22] Filed: Mar. 31, 1987

Related U.S. Application Data

[60] Division of Ser. No. 758,634, Jul. 24, 1986, Pat. No. 4,675,394, which is a continuation-in-part of Ser. No. 641,820, Aug. 17, 1984, abandoned.

[51] Int. Cl.$^4$ ............... C08B 11/00; D21H 3/28; D21H 5/12
[52] U.S. Cl. .................. 162/175; 162/158; 162/177; 162/178; 536/43; 536/111; 536/114; 536/50; 536/4.1; 536/44; 536/45; 536/52; 536/84
[58] Field of Search ............ 162/158, 175, 177, 178; 536/43, 111, 114

[56] References Cited

U.S. PATENT DOCUMENTS

| | | | |
|---|---|---|---|
| 3,392,085 | 7/1968 | Oliver | 162/178 |
| 3,472,840 | 10/1969 | Stone et al. | 162/177 |
| 3,691,153 | 9/1972 | Vemuri | 162/178 |
| 4,243,479 | 1/1981 | Tessler | 162/175 |
| 4,557,801 | 12/1985 | Avis | 162/178 |
| 4,605,702 | 8/1986 | Guerro et al. | 525/154 |
| 4,605,718 | 8/1986 | Jansma et al. | 526/240 |
| 4,610,761 | 9/1986 | Eklund et al. | 162/178 |
| 4,675,394 | 6/1987 | Solarek et al. | 536/43 |

*Primary Examiner*—Ronald W. Griffin
*Attorney, Agent, or Firm*—Margaret B. Kelley; Edwin M. Szala

[57] ABSTRACT

Polysaccharide aldehydes having the general structure

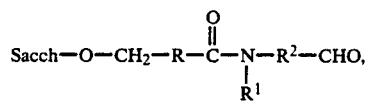

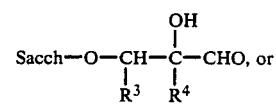

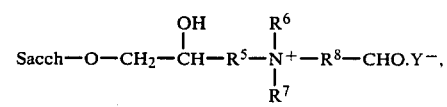

such as starch, cellulose and gum aldehydes, are useful for imparting wet, dry, or temporary wet strength to paper. They are prepared by a non-oxidative method which involves reacting the polysaccharide base, in the presence of alkali, with a derivatizing acetal reagent having the general structure

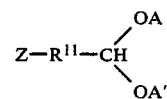

and then hydrolyzing the acetal by adjusting the pH to less than 7, preferably 2–4. R is $(CH_2)_n$ or a divalent aromatic group and n os 0 or greater; $R^1$, $R^6$, and $R^7$ are hydrogen or an organic group; $R^2$, $R^5$, and $R^8$ are $(CH_2)_m$ with m being 1–6; $R^3$ and $R^4$ are hydrogen or a lower alkyl; Y is an anion; Z is an organic group capable of reacting with the polysaccharide base to form an ether derivative and selected from the group consisting of an epoxide, ethylenically unsaturated group, halohydrin, and halogen; $R^{11}$, if present, is a divalent organic group containing no reactive substiuents; and A and A' are lower alkyls or together form at least a 5-membered cyclic acetal.

18 Claims, No Drawings

POLYSACCHARIDE DERIVATIVES CONTAINING ALDEHYDE GROUPS FOR USE AS PAPER ADDITIVES

This application is a division of application Ser. No. 758,634, filed July 24, 1986, now U.S. Pat. No. 4,675,394, which is a continuation-in-part of Ser. No. 641,820 filed Aug. 17, 1984, now abandoned.

BACKGROUND OF THE INVENTION

The present invention relates to polysaccharide derivatives containing aldehyde groups and to the acetal derivatives used in the preparation thereof. It also relates to a non-oxidative process for introducing aldehyde groups into polysaccharides. It further relates to the use of the cationic aldehyde-containing derivatives as paper additives.

As used herein, the term "paper" includes sheet-like masses and molded products made from fibrous cellulosic materials which may be derived from natural sources as well as from synthetics such as polyamides, polyesters, and polyacrylic resins, and from material fibers such as asbestos and glass. In addition, papers made from combinations of cellulosic and synthetic materials are applicable herein. Paperboard is also included within the broad term "paper".

Oxidative and non-oxidative methods have been used to introduce aldehyde groups into polysaccharides such as starches, gums, celluloses. The oxidative methods used have included treatment with periodic acid, periodates, or alkali metal ferrates. See U.S. Pat. No. 3,086,969 (issued Apr. 23, 1963 to J. E. Slager) which discloses an improved process for the preparation of a dialdehyde polysaccharide, (e.g., starch) using periodic acid; U.S. Pat. No. 3,062,652 (issued Nov. 6, 1962 to R. A. Jeffreys et al.) which discloses the preparation of dialdehyde gums (e.g., gum acacia, pectin, and guar) using periodate or periodic acid; and U.S. Pat. No. 3,632,802 (issued Jan. 4, 1972 to J. N. BeMiller et al.) which discloses a method for oxidizing a carbohydrate, (e.g., starch or cellulose) with an alkali metal ferrate.

In the above methods the aldehyde groups are formed by the oxidation of the hydroxyl groups on the ring and/or side chain. Treatment with periodic acid or periodate selectively oxidizes the 2,3-glycol structures (i.e., the adjacent secondary hydroxyl groups on the ring carbon atoms), cleaves the ring, and results in a "so-called" dialdehyde derivative which is principally a hydrated hemialdal and intraand intermolecular hemiacetals. Treatment of carbohydrates with alkali metal ferrates selectively oxidizes the primary alcohol group on the side chains without ring cleavage or oxidation of the ring hydroxyls.

The disadvantages of the oxidative method include degradation to lower molecular weight products and the formation of carboxyl groups due to further oxidation of the aldehyde groups. U.S. Pat. No. 3,553,193 (issued Jan. 5, 1973 to D. H. LeRoy et al.) describes a method for oxidizing starch using an alkali metal bromite or hypobromite under carefully controlled conditions. The resulting dialdehyde is reported to have a substantially greater proportion of carbonyl groups (i.e., aldehyde groups) than carboxyl groups. It also discloses a method for selectively oxidizing the side chains of starch derivatives (e.g., an alkoxylated starch such as dihydroxypropyl starch) under the same process conditions whereby the underivatized starch hydroxy groups on the rings are substantially non-oxidized.

The presence of carboxylic groups in aldehyde starches has several disadvantages in addition to the obvious reduction in the degree of aldehyde substitution. These include the introduction of hydrophilic properties due to the carboxyl groups, an upset in the cationic/anionic ratio when a cationic starch base is used (as in most papermaking wet end uses), and the possible formation of salts (in the above paper-making end use) which could give rise to ionic crosslinking.

The non-oxidative methods typically involve the reaction of the polysaccharide with an aldehyde-containing reagent. See U.S. Pat. No. 3,519,618 (issued July 7, 1970 to S. M. Parmerter) and U.S. Pat. No. 3,740,391 (issued June 19, 1973 to L. L. Williams et al.) which cover starch derivatives and U.S. Pat. No. 2,803,558 (issued Aug. 20, 1957 to G. D. Fronmuller) which covers a gum derivative. The starch derivative of Parmerter is prepared by reaction with an unsaturated aldehyde (e.g., acrolein) and has the structure Starch-O-CH($R^1$)-CH($R^2$)-CHO where $R^1$ and $R^2$ are hydrogen, lower alkyls or halogen. The starch derivative of Williams is prepared by reaction with acrylamide followed by reaction with glyoxal and has the structure

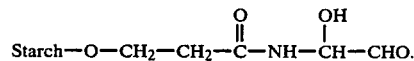

The gum derivative of Fronmuller is prepared by treating the dry gum (e.g., locust bean or guar gum) with peracetic acid to reduce the viscosity, neutralizing, and then reacting with glyoxal. Water-soluble cellulose ethers (e.g., hydroxyethylcellulose) have also been reacted with glyoxal or ureaformaldehyde to give aldehyde-containing derivatives.

One of the disadvantages of introducing the aldehyde groups directly using an aldehyde-containing reagent is the possibility of the derivative crosslinking prior to use. This is a particular disadvantage when the products are being used to impart temporary wet strength to paper via a crosslinking reaction with the cellulose fibers. The Williams patent (cited above) alludes to this problem when it notes that solutions of the glyoxalated polymers "are stable for at least a week when diluted to 10% solids by weight and adjusted to pH 3" (see Col. 3, lines 60–63). The Parmerter patent notes that the starch aldehyde is "a substantially non-crosslinked granular starch derivative" and discusses the importance of the non-crosslinked character (see Col. 2, lines 40–45).

Therefore there is a need for aldehyde-containing polysaccharide derivatives and an improved non-oxidative method for their preparation which does not crosslink the derivative.

SUMMARY OF THE INVENTION

The present invention provides novel polysaccharide aldehyde derivatives which have the formula

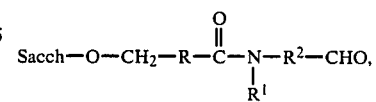

-continued

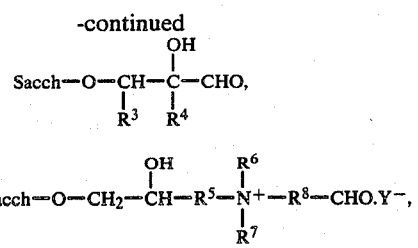

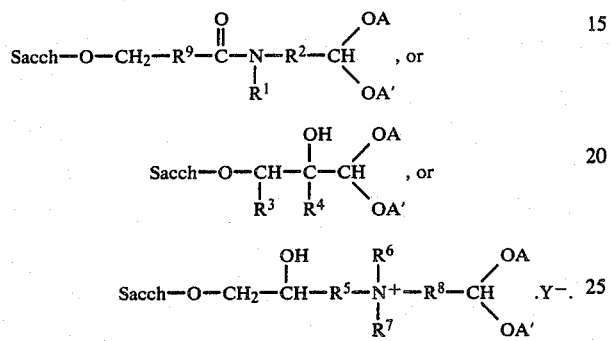

as well as novel polysaccharide acetals which have the formula

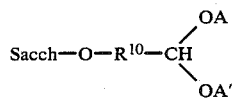

It also provides a polysaccharide aldehyde having the formula Sacch—O—R$^{10}$—CHO prepared by hydrolyzing, at a pH of less than 7, a polysaccharide acetal having the formula $$\text{Sacch}-\text{O}-\text{R}^{10}-\text{CH}\begin{array}{c}\diagup\text{OA}\\\diagdown\text{OA}'\end{array}$$

which is prepared by reacting the polysaccharide, at a pH of about 9 or above, with an acetal reagent which does not substantially crosslink or oxidize the polysaccharide during the reaction. The reagent is described hereafter.

In the above formulas Sacch—O— represents a polysaccharide molecule (wherein in the hydrogen of a hydroxyl group of a saccharide unit has been replaced as shown); R is (CH$_2$)$_n$ or a divalent aromatic group and n is zero or greater; R$^9$ is (CH$_2$)$_n$ or a divalent aromatic group and n is zero or greater, with the proviso that n is 1 or more when the polysaccharide molecule is a starch molecule; R$^1$, R$^6$ and R$^7$ are hydrogen, an alkyl (preferably methyl), aryl, aralkyl, or alkaryl group; R$^2$, R$^5$ and R$^8$ are (CH$_2$)$_m$ with m being 1-6 (preferably 1-2); R$^3$ and R$^4$ are hydrogen or a lower alkyl, preferably methyl; R$^{10}$ is a divalent organic group, containing no starch-reactive substituents; A and A' are independently a lower alkyl or A and A' together form at least a 5-membered cyclic acetal; and Y is an anion such as a halide, sulfate, or nitrate. The polysaccharide molecule may be modified by the introduction of cationic, anionic, nonionic, amphoteric, and/or zwitterionic substituent groups. As used herein, the terms "cationic" and "anionic" are intended to cover cationogenic and anionogenic groups and the term "reactive substituents" refers to substituents which react with polysaccharide to form a covalent bond.

The aldehydes are prepared by hydrolyzing the corresponding acetal at a pH of less than 7, preferably 5 or less, most preferably 2.0-4.0 The acetals are prepared by reacting the polysaccharide with an acetal reagent having the general structure

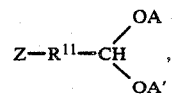

where Z is an organic group capable of reacting with the polysaccharide molecule to form an ether derivative and selected from the group consisting of an epoxide, a halohydrin, an ethylenically unsaturated group, and a halogen and R$^{11}$, if present, is a divalent organic group containing no reactive substituents.

Typical reagents have the formula

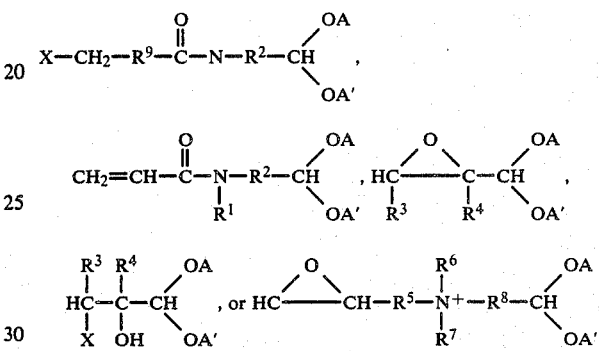

where R$^1$ to R$^9$ and A and A' are as defined above and X is chlorine, bromine, or iodine. In the halohydrin reagent the halogen and hydroxyl groups may be interchanged.

The aldehyde and acetal derivatives are useful in conventional applications where water soluble or water swellable polysaccharide derivatives are useful, for example, as coatings, adhesives and paper additives. The cationic aldehyde-containing derivatives are particularly useful as paper additives. They are useful as temporary wet strength additives, for example in tissue/toweling paper stocks, and as wet and dry strength additives for all paper types including liner board. Typical cationic and cationogenic groups include the diethylaminoethyl ether groups introduced by reactions with 2-diethylaminoethyl chloride hydrochloride or 3-(trimethyl ammonium chloride)-2-hydroxypropyl ether groups introduced by reaction with 3-chloro-2-hydroxypropyl trimethylammonium chloride.

DESCRIPTION OF THE PREFERRED EMBODIMENTS

When the polysaccharide is starch, applicable starch bases which may be used herein may be derived from any plant source including corn, potato, sweet potato, wheat, rice, sago, tapioca, waxy maize, sorghum, high amylose corn, or the like. Starch flours may also be used as a starch source. Also included are the conversion products derived from any of the former bases including, for example, dextrins prepared by the hydrolytic action of acid and/or heat; oxidized starches prepared by treatment with oxidants such as sodium hypochlorite; fluidity or thin-boiling starches prepared by enzyme conversion or mild acid hydrolysis; and derivatized and crosslinked starches. The starch base may be a granular starch or a gelatinized starch, i.e. non-granular starch.

When the polysaccharide is gum, applicable bases which may be used herein are polygalactomannans, which are heteropolysacchrides composed principally of long chains of 1→4β-D-mannopyranosyl units to which single unit side chains of α-D-galactopyranosyl units are joined by 1→6 linkages and hereafter referred to as "gums". Also included are degraded gum products resulting from the hydrolytic action of acid, heat, shear, and/or enzyme; oxidized gums; and derivatized gums. The preferred gums include gum arabic, as well as guar gum and locust bean gum because of their commercial availability.

When the polysaccharide is cellulose, applicable bases useful herein include cellulose and cellulose derivatives, especially water-soluble cellulose ethers such as alkyl and hydroxyalkylcelluloses, specifically methylcellulose, hydroxypropylmethyl cellulose, hydroxybutylmethylcellulose, hydroxyethylmethylcellulose, and ethylhydroxyethylcellulose.

Methods for preparing the modified polysaccharide bases are wellknown to those skilled in the art and discussed in the literature. See, for example, R. L. Whistler, Methods in Carbohydrate Chemistry, Vol. IV, 1964, pp. 279–311; R. L. Whistler et al., Starch-Chemistry and Technology, Vol. II, 1967, pp. 293–430; R. L. Davidson and N. Sittig, Water-Soluble Resins, 2nd Ed., 1968, Chapter 2; and R. L. Davison, Handbook of Water-Soluble Gums and Resins, 1980, Chapters 3, 4, 12 and 13 directed to cellulose derivatives, Chapters 6 and 14 directed to gums, and Chapter 22 directed to starch.

The starch reactions with the derivatizing reagents that introduce the acetal groups are carried out using the general procedure described in U.S. Pat. No. 3,880,832 issued Apr. 29, 1975 to M. M. Tessler. Granular reactions are typically carried out in water at 20°–50° C., preferably about 40°–45° C. Non-granular starch reactions may be carried out at higher temperatures (e.g., up to 100° C.). The reaction mixture is preferably agitated. Reaction time may vary from about 0.5–20 hours, preferably 8–16 hours, for aqueous reactions or from about 1–8 hours for reactions carried out in a substantially dry reaction medium. It will depend on such factors as the amount of reagent employed, the temperature, the scale of the reaction, and the degree of substitution desired. The pH is maintained at about 10–13, preferably 11–12, during the reagent addition and during the entire reaction using a base such as sodium, potassium, or calcium hydroxide. Sodium sulfate is typically added to the reaction mixture to reduce swelling of the granular starch; it is not used when calcium hydroxide is the base. Potassium or sodium iodide is a good catalyst for reacting the chloroacetylated amine derivatives, but it is not necessary for a satisfactory reaction with the starch. After completion of the reaction, the excess alkali is neutralized and the pH is adjusted to about 7–8 using any conventional acid prior to recovery of the starch. If the final pH of the starch derivative is less than about 5–6, the derivatives may crosslink with time and disperse poorly or not at all.

The gum reactions with the acetal reagents are carried out in a two-phase reaction system comprising an aqueous solution of a water-miscible solvent and the water-soluble reagent in contact with the solid gum. The water content may vary from 10 to 60% by weight depending upon the water-miscible solvent selected. If too much water is present in the reaction system, the gum may swell or enter into solution thereby complicating recovery and purification of the derivative. The water-miscible solvent is added in the amount sufficient for the preparation of a slurry which can be agitated and pumped. The weight ratio of water-miscible solvent to gum may vary from 1:1 to 10:1, preferably from 1.5:1 to 5:1. Suitable water-miscible solvents include alkanols, glycols, cyclic and acylic alkyl ethers, alkanones, dialkyformamide and mixtures thereof. Typical solvents include methanol, ethanol, isopropanol, secondary pentanol, ethylene glycol, acetone, methyethylketone, diethylketone, tetrahydrofuran, dioxane, and dimethylformamide. The reaction times and temperatures used for the aqueous reactions are suitable for the solvent reaction.

The cellulose reactions with the acetal reagents are conveniently carried out using the procedure of U.S. Pat. No. 4,129,722 (issued Dec. 12, 1978 to C. P. Iovine et al.). The cellulose or cellulose derivative is suspended in an organic solvent and a water solution of the derivatizing reagent is added thereto. Derivatization in the resultant two-phase mixture is ordinarily carried out with agitation at temperatures of 30° to 85° C., adding alkali if necessary to effect reaction. At least one of the initial phases (i.e., the suspended cellulose or cellulose derivative or the aqueous reagent solution) contains a suitable surfactant. It is important that the organic solvent used in the initial cellulose phase be immiscible with the aqueous derivatizing reagent phase, that it not dissolve the cellulose derivative as it is formed, that it have a boiling point at or above the temperature of the derivatizing reaction, that it be insensitive to alkali and not participate in the derivatization reaction.

The two phase procedure may also be used to prepare starch and gum derivatives as well as cellulose derivatives. It may also be used to prepare derivatives containing substituents derived from different reagents without isolating the substitution product from each reagent. This multiple substitution may be accomplished by the addition of several different reagents to the substrate-surfactant alkali mixture at the same time or sequentially.

After completion of the acetal reaction the solid acetals may be separated, if desired, from the reaction mixture by centrifugation or filtration. Preferably, the derivative is purified by washing with water in the case of the starch derivatives, with the aqueous solution of water-miscible solvent in the case of the gum derivatives or with the solvent in the case of the cellulose derivatives. Further washing with a more anhydrous form of the same solvent may be desirable for the gum derivatives. The derivatives are then dried using conventional methods, as in a vacuum, drum, flash, belt, or spray drier.

The conversion of the polysaccharide acetals to the aldehydes is carried out under acidic conditions, typically at a pH of 6 or less, preferably 5 or less, most preferably at about 2–3. It may be carried out directly without isolation of the acetal or the acetal may be isolated as above and resuspended in water prior to conversion. If desired, the derivatives may be recovered as described above.

In addition to preparing the above acetals, or aldehydes, modified derivatives may be prepared which contain other substitutent groups, hydroxyalkyl groups (e.g., hydroxypropyl ether groups), carboxyalkyl ether groups (e.g., carboxymethyl), ester groups (e.g., acetate groups), tertiary amino groups (e.g., diethylaminoethyl ether groups), and quaternary amine groups, (e.g. 3-(trimethylammonium chloride)-2-hydroxypropyl grops or 4-(trimethylammonium chloride)2-butenyl groups), introduced prior to or subsequent to reaction with the acetal derivatizing reagent or introduced simultaneously by reaction with the acetal reagent and other derivatizing reagent.

The aldehyde derivatives used as paper additives preferably contain cationic (e.g., such as the quaternary ammonium and teriary amine group discussed above), amphoteric, and/or zwitterionic groups. These derivatives are dispersed in water before use. The granular starch derivatives are cooked to provide the dispersed derivative.

The starch may be cooked prior to derivatization to form the acetal, subsequent to derivatization, after conversion to the aldehyde, or most conveniently during conversion of the acetal to the aldehyde. Cooking at pH 6 or less simultaneously converts the acetal to aldehyde and solubilizes and disperses the starch aldehyde. Any conventional cooking procedure may be used, such as cooking a slurry containing the water-soluble or water-swellable derivative in a boiling water bath for about 20 minutes, blowing in steam to heat the slurry to about 93° C. (200° F.), or jet cooking. If a water-dispersible or water-soluble starch base is used for the preparation of the acetal, it will not be necessary to cook the acetal during the acid hydrolysis.

The aldehyde derivatives described herein may be used as beater additives, although their addition to the pulp may occur at any point in the paper-making process prior to the ultimate conversion of the wet pulp into a dry web or sheet. Thus, for example, they may be added to the pulp while the latter is in the hydropulper, beater, various stock chests, or headbox. The derivatives may also be sprayed onto the wet web. If the derivative is trapped in the wet fibers after spraying, it may not be necessary to use cationic aldehyde derivatives but they are preferred.

The aldehydes herein may be effectively used for addition to pulp prepared from any type of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical chemiground wood, ground wood or any combination of these fibers. Fibers of the viscous rayon or regenerated cellulose type may also be used if desired.

Any desired inert mineral fillers may be added to the pulp which is to be modified with the aldehydes herein. Such materials include clay, titanium dioxide, talc, calcium carbonate, calcium sulfate and diatomac ous earths. Rosin or synthetic internal size may also be present if desired.

The proportion of the aldehyde to be incorporated into the paper pulp may vary in accordance with the particular pulp involved and the properties desired (e.g., wet strength, temporary wet strength, or dry strength). In general, it is preferred to use about 0.1–10% preferably about 0.25–5% of the derivative, based on the dry weight of the pulp. Within this preferred range the precise amount which is used will depend upon the type of pulp being used, the specific operating conditions, the particular end use for which the paper is intended, and the particular property to be imparted. The use of amounts greater than 5%, based on the dry weight of the pulp, is not precluded, but is ordinarily unnecessary in order to achieve the desired results.

It can be appreciated by the practitioner that a large number of variations may be effected in selecting the acetal derivatizing reagents, reacting them with the bases converting them to the aldehydes, and utilizing the aldehyde derivatives as wet end additives for paper in accordance with the procedure described above without materially departing from the scope and spirit of the invention. Such variations will be evident to those skilled in the art and are to be included within the scope of the invention.

In the examples which follow, all parts and percentages are given by weight and all temperatures are in degrees Celsius unless otherwise noted. Reagent percentages are based on dry polysaccharide. The nitrogen content of the cationic bases and resulting acetals was measured by the Kjeldahl method and are based on dry polysaccharide.

In the paper tests, the tensile strengths are reported as breaking length (m.). The breaking length is the calculated limiting length of a strip of uniform width, beyond which, if such as strip were suspended by one end, it would break of its own weight. The breaking length (air dry) in meters (m.) is calculated using the formula B.L.=102,000 (T/R)=3,658 (T'/R'), where T is tensile strength in kN./m., T' is tensile strength in lb./in., R is grammage (air dry) in g./m.$^2$, and R' is weight per unit area (air dry in lb./1000 ft.$^2$). Paper specimens are selected in accordance with TAPPI T 400 sampling procedure. Those evaluated for wet strength and temporary wet strength were saturated with distilled water by immersion and/or soaking until the paper sample was thoroughly wetted. The strength was evaluated in accordance with TAPPI T 494 om-82. The measurements were carried out using a constant rate of elongation apparatus, i.e. a Finch wet strength device, which is described in TAPPI Procedure T 456 om-82 (1982). The dry strength was evaluated in accordance with TAPPI T 494 om-81.

EXAMPLE 1

This example describes the preparation of known cationic starch acetals by several methods using various starch bases. The reagents used for preparing the starch acetals have the general formula

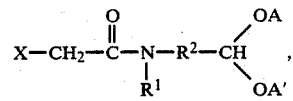

where R$^1$ is H or —CH$_3$, R$^2$ is —CH$_2$—, A and A' are —CH$_3$ or —C$_2$H$_5$, and X is Cl or Br. They are prepared by reacting a haloacetyl halide with aminoacetaldehyde diethyl acetal or methylaminoacetaldehyde dimethyl acetal as described below.

Acetal Reagent Preparation

Reagent A—N-(2,2-Dimethoxyethyl)-N-methyl-2-chloracetamide, which has the formula

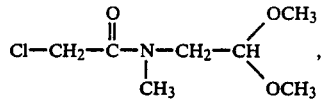

is prepared by adding chloroacetyl chloride (29.05 g.) dropwise to a stirred mixture of methylaminoacetaldehyde dimethyl acetal (33.5 g.) in toluene (170 ml.) and 20% aqueous sodium hydroxide (52.9 g.). The reaction was cooled by immersion in an ice/brine bath and the addition rate was adjusted to maintain the reaction temperature at 0°–5° C. The total addition took 10 mins. at which time the cooling bath was removed. Agitation was continued for an additional 10 mins. and the phases were then separated. Excess toluene was removed from the upper organic phase by distillation at the aspirator to give Reagent A as a brown liquid.

Reagent B—N-(2,2-Diethoxyethyl)chloroacetamide, which has the formula

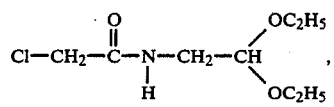

was prepared as above except that aminoacet aldehyde diethyl acetal (37.4 g.) was substituted for the methylaminoacetaldehyde dimethyl acetal. The product was isolated as a yellow waxy solid.

Reagent C—N-(2,2-Dimethoxyethyl)-N-methyl-2-bromoacetamide, which has the formula

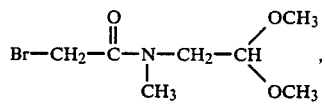

was prepared in the same way as Reagent A except that bromoacetyl chloride (40.4 g.) was substituted for the chloroacetyl chloride. The product was isolated as a brown liquid.

Starch Reactions

Part A. Consecutive Reactions Using Cationic Reagent Followed by Acetal Reagent (1) A waxy maize starch (250 g.) was slurried in 375 ml. of water. To the slurry was added 2.3% calcium hydroxide (Ca(OH)$_2$) followed by 6.3% of a 50% aqueous solution of 2-diethylaminoethylchloride hydrochloride (DEC). The reaction was run at 40° C. for 6 hrs. A 10% aqueous hydrochloric acid solution (HCl) was added to adjust the pH to 3.0. The mixture was filtered and the solids washed. A portion of the filter cake containing 50 g. of the cationic starch ether was dried and analyzed. Cationic N was 0.28%.

The remaining filter cake (about 200 g. starch) was reslurried in 150 cc water; 80 g. of sodium sulfate (Na$_2$SO$_4$) were added; and the pH was raised to about 11.0–11.5 by adding a 4.5% sodium hydroxide (NaOH) solution containing 10% Na$_2$SO$_4$. A total of 19.0 g. (9.5%) of Reagent A was added. The slurry was placed in a bath at 45° C. for 16 hrs. while maintaining the pH above 11.0 with the 4.5% NaOH solution. The pH was adjusted to about 7.0–8.0, with 10% HCl. The resulting product was filtered, washed with water adjusted to pH 7.0–8.0, and dried. It contained 0.72% total N. The nitrogen content due to the acetal substituent was 0.44%.

(2) The DEC reaction was carried out as in (1) except that corn starch was used. Cationic N was 0.29%. Acetal reaction was carried out using 5% potassium iodide (KI) as a catalyst (see U.S. Pat. No. 3,880,832 cited previously). A total of 1000 g. of the cationic corn starch was suspended in 1250 ml. of water containing 300 g. Na$_2$SO$_4$. An aqueous solution of 40 g. NaOH, 50 g. Na$_2$SO$_4$, and 710 g. water was added slowly to the starch slurry. Then 300 g. of Reagent B were added all at once followed by the KI. Reaction conditions were 16 hr. at 45° C. The derivative was recovered as above but, after washing, it was resuspended in water and 5 g. sodium bisulfite was added. The slurry was filtered but not washed. The bisulfite salt prevents oxidation of the I-salts to iodine which produces a brown color. Acetal N was 0.41%.

(3) The DEC reaction was carried out on a waxy maize starch using the procedure of (1) except that 40% Na$_2$SO$_4$ was used to repress swelling and 4.5% NaOH was used to maintain the pH at above 10.8. Cationic N was 0.232%. The acetal reaction was carried out as in (1) except that 11% Reagent A (based on about 200 g. starch remaining in the slurry) was used. No Na$_2$SO$_4$ was added. The pH was adjusted to above 10.8 with 4.5% NaOH. Reaction conditions were 19 hr. at 40° C. Acetal N was 0.37%.

(4) The DEC and acetal reactions were carried out on a waxy maize starch using Reagent A (9.5%) and the procedure of (3) except that 12% aqueous potassium hydroxide was used to control the reaction and no Na$_2$SO$_4$ was used. Cationic and acetal N were 0.25% and 0.45% respectively.

(5) The DEC reaction was carried out on a waxy maize starch using the procedure of (3). Cationic N was 0.26%. The acetal reaction was carried out in 300 ml. of water containing 80 g. Na$_2$SO$_4$. The pH was adjusted to 11.2–11.5 using the NaOH/Na$_2$SO$_4$ solution of (1). Reagent A (11%) was used; the reaction conditions were 19 hr. at 30° C. Acetal N was 0.40%.

(6) The DEC and acetal reactions were carried out as in (5) except at 50° C. Cationic and acetal N were 0.26% and 0.32% respectively.

Part B. Simultaneous Reaction (1) an unmodified waxy maize starch was slurried in water and 3.15% DEC and 12% Reagent A were added while maintaining the pH above 11.0 with a 4.5% NaOH solution. The reaction mixture was maintained at 45° C. and pH 11.0–11.5 for 16 hr. and then neutralized to pH 7.5. The product was recovered as above. It had a total N content of 0.77%.

(2) A similar reaction was carried out using potato starch (200 g.) and 16 parts of a 50% solution of 3-chloro-2-hydroxypropyl trimethyl ammonium chloride and 12% Reagent A. The product contained 0.91% total N. Cationic N was not determined (theoretical was about 0.3% maximum). The potato starch base contained about 0.013% N. Acetal N should be about 0.60%.

Part C. Consecutive Reaction Using Acetal Reagent Followed by Cationic Reagent

An unmodified waxy maize starch (1000 g.) was slurried in 1500 cc. water containing 400 g. Na$_2$SO$_4$, and the pH was raised to 11.2 with a NaOH solution made by dissolving 40 g. of solid NaOH and 90 g. Na$_2$SO$_4$ in 770 g. water. The above acetal reagent A (10%) was added and the reaction was maintained at pH 11.2 and 45° C. for 16 hrs. The product (recovered as above) had an acetal N content of 0.57%.

The resulting acetal (200 g.) was reacted with 16 g. of the 50% aqueous DEC solution as described in above. The final product contained 0.72% total N.

Part D. Dry Reaction 200 g. of a cationic, waxy maize starch (0.26% nitrogen) made as in Part A-No. 3 were impregnated in a Hobart mixer with a solution consisting of 24 g. acetal reagent A, 2.5 g. NaOH and 24 cc water. After stirring to insure a homogeneous blend, the sample was placed in a jar in an oven at 75° C. After 2 hrs. the sample was suspended in 95–100% ethanol and filtered. The resulting filter cake was resuspended in a 1:1 (by volume) ethanol-water mixture, pH was adjusted to 7.5, and the sample was filtered and washed repeatedly with the 1:1 ethanol-water. Final nitrogen on the purified product was 0.48%, and therefore an acetal nitrogen of 0.22% was obtained by the "dry" reaction.

EXAMPLE II

This example describes the preparation of novel starch acetals using reagents other than the acetamide reagents of the previous example.

Acetal Reagent Preparation

Reagent D—N-(2,2-Dimethoxyethyl)-N-methyl-3-chloropropionamide, which has the formula

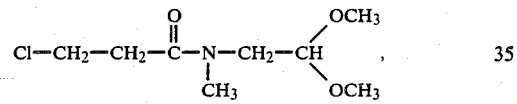

was prepared according to the procedure used to make Reagent A except the chloropropionyl chloride (32.7 g.) was substituted for chloroacetyl chloride. The product was isolated as a pale yellow liquid.

Reagent E—N-(2,2-Dimethoxyethyl)-N-methyl acrylamide, which has the formula

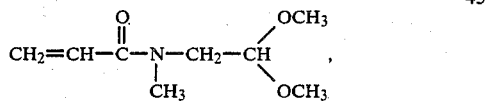

was prepared according to the procedure used to make Reagent A except that acryloyl chloride (23.3 g.) was used instead of chloroacetyl chloride and 4-t-butylcatechol (0.1 g.) was added to the organic phase before removal of the solvent. The final product was isolated as a clear liquid by distillation (65°–66° C.-0.2–0.3 mm Hg.).

Reagent F—1,2-Epoxy-3,3-dimethoxypropane, which has the formula

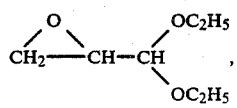

was prepared from acrolein as described by D. T. Weisblat et al. See J. Am. Chem. Soc., Vol. 75, p. 5893 (1953).

Reagent G—N-(2,2-Dimethoxyethyl)-N,N-dimethyl-N-(2,3-epoxypropyl) ammonium chloride, which has the formula

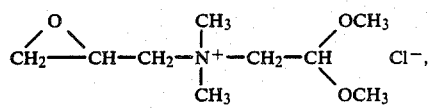

was prepared by adjusting the pH of a 40% solution of dimethylaminoacetaldehyde diethyl acetal (30.01 g.) to pH 7.5 with concentrated HCl and then dropping epichlorohydrin (22.8 g.) into the solution. The reaction mixture was held for 2 hrs. while maintaining the pH between 7.5–8.5 by the addition of concentrated HCl or 50% NaOH. The temperature was maintained at 30°–35° C. Impurities and excess reagent were removed from the reaction mixture by extraction with ethyl acetate (4 times with 65 ml. each time). The product was isolated as an aqueous solution which was pH adjusted to 7.0.

Reagent H—1,2-Epoxy-3,3-dimethoxypropane, which has the formula

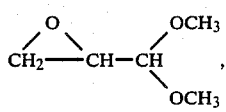

was prepared using the procedure of D. T. Weisblat except that trimethyl orthoformate was used in place of triethyl orthoformate.

Reagent I—1,2-Epoxyethyl-1,3-dioxalane, which has the formula

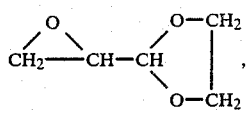

can be prepared by a modification of the procedure of D. T. Weisblat et al. The ethylene acetal of acrolein is used instead of the diethyl acetal.

Reagent J—3-(Chloromethyl)-N-(2,2-dimethoxyethyl)-N-methyl benzamide, which has the formula

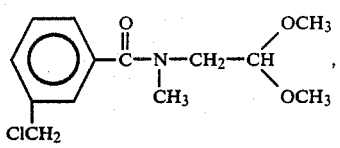

was prepared according to the procedure used to make Reagent A except that 3-(chloromethyl) benzoyl chloride (48.6 g.) was used instead of chloroacetyl chloride. The product was isolated as a pale yellow oil after removal of the solvent. It contained 4.8% N (theoretical 5.15%).

Starch Reactions

The starch reactions with Reagents D to G and J were carried out as in Example I, Part A, No. 1 using 30 g. Na$_2$SO$_4$ in the slurry of starch (100 g.) and a solution of 3.4 g. NaOH and 5 g. Na$_2$SO$_4$ in 70 g. water to adjust the pH. The reagent amounts, starch base, and nitrogen content are shown below.

| Starch Base | % Cationic N in Base | Acetal Reagent | % Acetal N in Cationic Acetal |
|---|---|---|---|
| Waxy corn | 0.270 | 15% D | 0.240 |
| Waxy corn | 0.270 | 12% E | 0.360 |
| Waxy corn | 0.270 | 12% F | None* |
| Corn | None | 15% G | 0.380 |
| Corn | None | 10% J | 0.279 |

*No nitrogen in acetal reagent

EXAMPLE III

This example describes the preparation of acetal starch derivatives other than cationic derivatives.

A. Potato, waxy maize, and tapioca starch were reacted with Reagent A of Example I using the following procedure: 100 g. of starch were slurried in 150 ml. water containing 30 g $Na_2SO_4$. A solution of 3.4 g. NaOH, 5 g. $Na_2SO_4$ and 70 g. water was added slowly to the slurry, followed by 12 g. of Reagent A. The samples were reacted 45° C., 16 hrs. and worked up using the method in example 1. Acetal nitrogen was 0.40%, 0.46% and 0.41%, respectively.

B. High amylose corn starch (70% amylose) was reacted with 20% of Reagent A using a procedure similar to that described in Example 1-Part C except that the starch was not treated with DEC after reaction with the acetal reagent. The product contained 0.99% acetal nitrogen.

C. A waxy maize 85 fluidity starch was reacted with 15% of Reagent A (see Example 1) using the procedure of Part B above. The product contained 0.75% acetal nitrogen.

D. A waxy maize starch cross-linked with phosphorus oxychloride and containing hydroxypropyl groups via reaction with propylene oxide was reacted with Reagent A using the procedure described above in A.

EXAMPLE IV

This example describes the preparation of guar gum acetals and a gum arabic acetal.

Part A

A cationic guar gum was prepared by slurrying 60 parts of guar gum in 360 parts of 50% aqueous isopropanol, heating the slurry to 40° C., and bubbling nitrogen gas into the slurry for 1 hr. A total of 7.2 parts of 50% aqueous sodium hydroxide was added, the slurry was stirred for about 10 min., and 4.8 parts of 50% aqueous DEC were added. The slurry was stirred for 4 hr. at 40° C. The pH was lowered to 8.2 with dilute acetic acid, and the derivative was recovered by filtration, washed with aqueous isopropanol followed by 100% isopropanol, and air-dried. It contained 0.93% N.

The resulting derivative may then be reslurried as above in aqueous isopropanol and further treated with 3 parts potassium iodide, 2.4 parts sodium hydroxide, and 1.2 parts of Reagent A of Example I. The reaction should be carried out for about 16 hr. at 45° C. The derivative may be recovered and purified as above and should be useful in imparting wet and dry strength to paper.

Part B

A total of 100 g. of guar gum was slurried in 600 ml. of a mixture of 1:1 water and isopropanol. The mixture was heated to 45° C., and 12.5 g. of 40% sodium hydroxide were added. The mixture reacted for about 16 hours (overnight) with stirring. It was neutralized with acetic acid to pH 8.5, filtered, and washed with 1500 ml. of the isopropanol-water mixture. The initial nitrogen on the guar was 0.677%; after the above alkali-solvent treatment it was reduced to 0.25%.

The treated guar (30 g.) was slurried in 100 ml. of the isopropanol-water mixture followed by 24.7 g. of 20% sodium hydroxide. The temperature was raised to 45° C. and 51 g. of Reagent A (see Example I) were added. The reaction was allowed to run 4 hours, followed by neutralization with acetic acid to pH 8.5, filtration, and washing with 1500 ml. of the isopropanol-water mixture. The % N on the final gum acetal was 0.54%.

Part C

Gum arabic (25 g.) was added to 50 ml. of water which contained 0.62 g. of sodium hydroxide (pH 11.3). Then 2.5 g. of Reagent A of Example I was added (10% based on the wt. of the gum). The slurry was reacted for 6 hours at 45° C., the pH was adjusted to 7.5 with 10% hydrochloric acid, and the soluble gum arabic derivative was recovered by alcohol (i.e., ethanol) precipitation. The N content was 0.535% compared with 0.344% for the underivatized base.

EXAMPLE V

This example describes the preparation of cellulose acetals. They were prepared using the general procedure of U.S. Pat. No. 4,129,722 (cited previously).

A total of 20 g. SPAN-80 (a surfactant available from Hercules) was dissolved in 200 g. Isopar E (petroleum solvent composed mostly of $C_8$ isoparafins, b. p. of 116°–142° C.) in a 500 ml. flask equipped with a thermometer, mechanical agitator, condenser and suitable size dropping funnels. Cationic hydroxyethylcellulose (50 g.) grafted with dimethyldiallylammonium chloride (DMDAAC) was added to the solvent-surfactant blend. Then 15 g. of Reagent A of Example I was dissolved in 10 ml. water and added to the reaction mixture over a 30 min. period. This was followed by addition of 8 ml. of 10N NaOH. The temperature was raised to 50° C. and held 3 hrs., followed by cooling to room temperature and neutralization to pH 8.0 with HCl. The cellulose derivative was filtered, washed with Isopar E and dried. Cationic N was 0.81%. Total N after dialysis was 1.43%. Acetal N was therefore 0.62%.

Using an identical procedure methyl cellulose (Methocel from Dow Chemical Co.) and cellulose (C-8002 alpha-cellulose from Sigma Co.) were reacted with 30% and 40%, respectively, of Reagent A. Acetal N on the methyl cellulose was 0.54% before and after dialysis. Acetal N on the alpha-cellulose was 0.3% after exhaustive washing with water.

EXAMPLE VI

The following chart (A) shows a list of reactants which, when reacted, will give acetamide reagents of the type

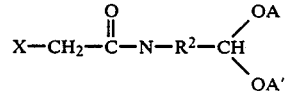

that can be reacted with polysaccharides such as starch, gum, and cellulose using the procedures of Examples I, IV or V. The indicated polysaccharide acetals should result from the reaction.

EXAMPLE VII

The following chart (B) shows a list of reactants which, when reacted and then conventionally oxidized, will give an epoxide reagent of the type

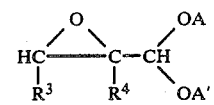

that can be reacted with polysaccharides such as starch, gum, or cellulose using the procedure for Reagent F of Example II, when starch is the base or a modification of that procedure when gum or cellulose are the bases.

CHART A

| Reactants | | | Acetal Reagent | Polysaccharide Acetal |
|---|---|---|---|---|
| A | + | B | | |
| Cl—CH$_2$—C(=O)—Cl<br>2-chloroacetyl chloride | | HN(CH$_2$CH(OCH$_3$)$_2$)(CH$_2$)$_2$CH$_3$<br>propylaminoacetaldehyde dimethyl acetal | Cl—CH$_2$—C(=O)—N(CH$_2$CH(OCH$_3$)$_2$)(CH$_2$)$_2$CH$_3$ | Sacch—O—CH$_2$—C(=O)—N(CH$_2$CH(OCH$_3$)$_2$)(CH$_2$)$_2$CH$_3$ |
| Br—CH$_2$—C(=O)—Cl<br>2-bromoacetyl chloride | | HN(CH$_2$)$_5$—CH(OCH$_3$)$_2$<br>6,6-dimethoxyhexyl amine | Br—CH$_2$—C(=O)—N(H)(CH$_2$)$_5$—CH(OCH$_3$)$_2$ | Sacch—O—CH$_2$—C(=O)—N(H)(CH$_2$)$_5$—CH(OCH$_3$)$_2$ |
| Cl—CH$_2$—C(=O)—Cl<br>2-chloroacetyl chloride | | H—N(CH(CH$_3$)$_2$)—CH$_2$—CH(O—CH$_2$–O—CH$_2$ cyclic)<br>isopropylaminoacetaldehyde ethylene acetal | Cl—CH$_2$—C(=O)—N(CH(CH$_3$)$_2$)—CH$_2$—CH(O—CH$_2$–O—CH$_2$) | Sacch—O—CH$_2$—C(=O)—N(CH(CH$_3$)$_2$)—CH$_2$—CH(O—CH$_2$–O—CH$_2$) |
| I—CH$_2$—C(=O)—Cl<br>2-iodoacetyl chloride | | H—N(H)—CH$_2$—CH(OCH$_3$)$_2$<br>aminoacetaldehyde dimethyl acetal | I—CH$_2$—C(=O)—N(H)—CH$_2$—CH(OCH$_3$)$_2$ | Sacch—O—CH$_2$—C(=O)—N(H)—CH$_2$—CH(OCH$_3$)$_2$ |
| Cl—CH$_2$—C(=O)—Cl<br>2-chloroacetyl chloride | | H—N(H)—CH$_2$—CH(OC$_4$H$_{10}$)$_2$<br>n-phenyl aminoacetaldehyde dibutyl acetal | Cl—CH$_2$—C(=O)—N(H)—CH$_2$—CH(OC$_4$H$_{10}$)$_2$ | Sacch—O—CH$_2$—C(=O)—N(H)—CH$_2$—CH(OC$_4$H$_{10}$)$_2$ |
| Br—CH$_2$—C(=O)—Cl<br>2-bromoacetyl | | H—N(p-tolyl)—CH$_2$—CH(O—CHCH$_3$–O—CH$_2$ cyclic)<br>n-tolyl aminoacetaldehyde | Br—CH$_2$—C(=O)—N(p-tolyl)—CH$_2$—CH(O—CHCH$_3$–O—CH$_2$) | Sacch—O—CH$_2$—C(=O)—N(p-tolyl)—CH$_2$—CH(O—CHCH$_3$–O—CH$_2$) |

CHART A-continued

| Reactants | | | Acetal Reagent | Polysaccharide Acetal |
|---|---|---|---|---|
| A | + | B | | |
| chloride | | propylene acetal | | |
| Cl—CH$_2$—C(=O)—Cl | | H—N(H)—CH$_2$—CH(OCH(CH$_3$)$_2$)(OC$_2$H$_5$)<br>aminoacetaldehyde ethyl isopropyl acetal | Cl—CH$_2$—C(=O)—N(H)—CH$_2$—CH(OCH(CH$_3$)$_2$)(OC$_2$H$_5$) | Sacch—O—CH$_2$—C(=O)—N(H)—CH$_2$—CH(OCH(CH$_3$)$_2$)(OC$_2$H$_5$) |
| 2-chloroacetyl chloride | | | | |
| Cl—CH$_2$—C(=O)—Cl | | H—N(C$_2$H$_5$)—CH$_2$—CH(O—CH$_2$—C(CH$_3$)$_2$—CH$_2$—O) (cyclic)<br>N—ethyldiamoacetaldehyde (2,2-dimethyl-1,3-propylene glycol) acetal | Cl—CH$_2$—C(=O)—N(C$_2$H$_5$)—CH$_2$—CH(O—CH$_2$—C(CH$_3$)$_2$—CH$_2$—O) (cyclic) | Sacch—O—CH$_2$—C(=O)—N(C$_2$H$_5$)—CH$_2$—CH(O—CH$_2$—C(CH$_3$)$_2$—CH$_2$—O) (cyclic) |
| 2-chloroacetyl chloride | | | | |

CHART B

| Reactants A | + B[a] | Acetal Reagent | Polysaccharide Acetal |
|---|---|---|---|
| CH(CHO)=CH—CH₃ (crotonaldehyde) | $C_2H_5OH$ | epoxide-type: CH(CH₃)—CH—CH(OC₂H₅)₂ with O bridge | Sacch—O—CH(CH₃)—CH—CH(OC₂H₅)₂ with OH |
| CH₂=C(CH₃)—CHO (methacrolein) | $HOCH_2CH_2OH$ | CH₂—C(CH₃)—CH with O bridges to cyclic —O—CH₂—CH₂—O— acetal | Sacch—O—CH₂—C(CH₃)(OH)—CH with cyclic —O—CH₂—CH₂—O— |
| CH(CHO)=C(CH₃)—CH₃ (2-methyl-but-2-ene-1-al) | $CH_3OH$ | CH(CH₃)—C(CH₃)—CH(OCH₃)₂ with O bridge | Sacch—O—CH(CH₃)—C(CH₃)(OH)—CH(OCH₃)₂ |
| CH₂=C(C₆H₁₃)—CHO (2-methylene octanal) | $CH_3$—CH(OH)—$CH_3$ | CH₂—C(C₆H₁₃)—CH(OCH(CH₃)₂)₂ with O bridge | Sacch—O—CH₂—C(C₆H₁₃)(OH)—CH(OCH(CH₃)₂)₂ |
| CH₂=C(C₆H₅)—CHO (2-phenyl acrolein) | $C_2H_5OH$ | CH₂—C(C₆H₅)—CH(OC₂H₅)₂ with O bridge | Sacch—O—CH₂—C(C₆H₅)(OH)—CH(OC₂H₅)₂ |

[a] 2 moles of alcohol except for the glycol HO—CH₂—CH₂—OH where 1 mole is used.

EXAMPLE VIII

This example describes the preparation of the aldehydes.

The starch acetals were converted to the corresponding aldehydes by slurrying the acetal in water (e.g., 100 parts of water/1 part of starch) and adjusting the pH to 2.5–3.0 with a dilute solution of hydrochloric acid. The starch acetals were cooked in a boiling water bath, prior to, after, or during the acidification to gelatinize the starch. The total cooking time was about 20 mins. The slurry was stirred during the acid addition and/or initial cooking. The cook was cooled rapidly.

The cellulose acetals were converted to the corresponding aldehydes as above but it was not necessary to cook the cellulose derivatives. The gum acetals can be converted to the corresponding aldehydes in a like manner.

EXAMPLE IX

This example describes the use of the cationic starch aldehydes and cationic cellulose aldehyde as paper strength additives. The aldehydes were added to the indicated paper furnish and handsheets were prepared at pH 6.0, dried at 121° C. (250° F.), cooled, cut into 1 in. strips, and cured at 105° C. (221° F.) for 5 min. The wet and dry tensile strengths are reported as breaking length (B.L.). The addition level was 20 lb./ton.

The derivatives and paper test results are given in Table I. All but No. 21 imparted initial wet strength and dry strength and were superior to the prior art cationic dialdehyde starch in initial wet strength. The cationic cellulose aldehyde provided the highest wet and dry strength.

EXAMPLE X

This example shows the effect of pH on the aldehyde generation. It also as illustrates the preparation of starch acetals containing mixed acetal substituent groups.

Part A—Preparation of The Mixed Acetal Reagents

Reagents K, L, and M were prepared by stirring 25 g. portions of Reagent A of Example I with 600 ml. of isopropanol (Reagent K), n-butanol (Reagent L), and tert-butanol (Reagent M) with 5 drops of concentrated hydrochloric acid for about 18 hours at room temperature. The reaction mixtures were filtered and stripped on a rotary evaporator at 40°–50° C., followed by vacuum pumping at 0.5 mm. Hg for 2 hours at room temperature. NMR analysis showed that about 10–20% of the dimethoxy groups (i.e., —CH(OCH₃)₂) had been exchanged with the respective solvents thus introducing isopropoxy groups (i.e., —CH(OCH(CH₃)₂)₂), n-butoxy groups (i.e., —CH(OCH₂CH₂CH₂CH₃)₂), (and tert-butoxy groups —CH(OC(CH₃)₃)₂).

Part B—Preparation of The Starch Derivatives

Cationic waxy maize acetal starch derivatives were prepared using the above reagents and the procedure of Example I, Part A (3). Nitrogen analysis showed the following:

| Starch | Reagent | % Cationic N | % Acetal N |
|---|---|---|---|
| 21 | J | 0.28 | 0.37 |
| 22 | K | 0.28 | 0.33 |
| 23 | L | 0.28 | 0.34 |
| Control | — | 0.28 | — |

TABLE I

| No. | Cationic Derivative Starch Base | % Cationic N in Base | Acetal Reagent | Method of Preparation | % Acetal N in Cationic Acetal | Initial Wet Strength (B.L. - m.) | Dry Strength (B.L. - m.) |
|---|---|---|---|---|---|---|---|
| Blank | None | — | — | — | — | 39 | 1682 |
| Control | Cationic Waxy Corn | 0.293 | None | * | None | 87 | 1866 |
| 1 | Corn Aldehyde | 0.293 | 30% B | See Eg. I-Part A2 | 0.409 | 444 | 2392 |
| 2 | Waxy Corn Aldehyde | 0.276 | 20% B | See Eg. I-Part A2 | 0.376 | 352 | 2358 |
| 3 | Corn Aldehyde | 0.278 | 10% A | See Eg. I-Part A2 | 0.502 | 414 | — |
| 4 | Corn Aldehyde | 0.278 | 12% A | See Eg. I-Part A2 | 0.347 | 729 | 3199 |
| 5 | Waxy Corn Aldehyde | 0.270 | 12% C | See Eg. I-Part A1 | 0.240 | 521 | 3019 |
| 6 | Corn Aldehyde | 0.276 | 6% B | See Eg. I-Part A2 | 0.670 | 413 | 3092 |
| 7 | Corn Aldehyde | 0.260 | 30% B | See Eg. I-Part A1 | 0.347 | 526 | 2999 |
| 8 | Corn Aldehyde | 0.287 | 10% A | See Eg. I-Part A2 | 0.491 | 448 | 2439 |
| 9 | Corn Aldehyde | 0.287 | 30% A | See Eg. I-Part A2 | 0.833 | 403 | 2105 |
| 10 | Waxy Corn Aldehyde | 0.240 | 20% B | See Eg. I-Part A2 | 0.202 | 406 | 2868 |
| 11 | Waxy Corn Aldehyde | 0.237 | 10% A | See Eg. I-Part A2 | 0.494 | 552 | 2811 |
| 12 | High Amylose Corn Aldehyde (70% Amylose) | 0.520 | 20% A | See Eg. I-Part A2 | 0.600 | 381 | 2165 |
| 13 | Fluidity Corn Aldehyde (79 WF) | 0.260 | 20% B | See Eg. I-Part A1 | 0.520 | 526 | 2997 |
| 14 | Fluidity Waxy Corn Aldehyde (35 WF) | 0.240 | 12% A | See Eg. I-Part A1 | 0.456 | 542 | 3010 |
| 15 | Fluidity Waxy Corn Aldehyde (85 WF) | 0.240 | 12% A | See Eg. I-Part A1 | 0.447 | 334 | 2203 |
| 16 | Waxy Corn Aldehyde** | N.D. | 12% A | See Eg. I-Part 1B | N.D. | 394 | 1907 |
| 17 | Waxy Corn Aldehyde | 0.270 | 15% D | See Eg. II | 0.240 | 474 | 2744 |
| 18 | Waxy Corn Aldehyde | 0.270 | 12% E | See Eg. II | 0.360 | 476 | 2504 |
| 19 | Waxy Corn Aldehyde | 0.270 | 12% F | See Eg. II | None | 317 | 2268 |
| 20 | Corn Aldehyde | None | 12% G | See Eg. II | 0.38 | 69 | 1372 |

*Prepared as in Part A-1 of Example I except that no acetal reagent was used.
**Total N was 0.773%.
N.D. - Not determined.

| | Cationic Derivative Starch Base | % Cationic N in Base | Acetal Reagent | Method of Preparation | % Acetal N in Cationic Acetal | Initial Wet Strength (B.L. - m.) | Dry Strength (B.L. - m.) |
|---|---|---|---|---|---|---|---|
| Comparative | Cationic Dialdehyde Starch** | 1.77 | None | Periodate Oxidation | None | 269 | 2176 |

**Caldas 10 (a commercial product from Japan Carlit Co.)

| Cationic Derivative | % Cationic N in Base | Acetal Reagent | Method of Preparation | % Acetal N in Cationic Acetal | Wet Strength | Dry Strength |
|---|---|---|---|---|---|---|
| Cellulose Base | 0.812 | 30% A | see Example V | 0.62 | 1660 | 6710 |

The control starch (which contained cationic groups from DEC), cationic dealdehyde starch, and cationic starch aldehydes of the present invention (Nos. 1-3, 5, 8, 9, 12 and 16-20) were evaluated in a paper furnish of 30% bleached Kraft and 70% bleached sulfite. The other cationic starch aldehydes of the present invention (Nos. 4, 6, 7, 10, 11 and 13-15) were evaluated in a paper furnish of 60% bleached Kraft and 40% bleached sulfite. The cationic cellulose aldehyde was evaluated in a paper furnish of 50% bleached Kraft and 50% bleached sulfite.

Part C—Evaluation of Wet Strength after Conversion To Aldehyde at Various pH Values One gram samples of the above starch acetals were slurried in water to a total weight of 100 g. and the pH was adjusted to pH 2.5 or 5.0. The starches were cooked and evaluated in paper handsheets as in Example VIII, Part A. The results are shown in Table II.

TABLE II

| Cationic Starch Derivative No. | Cook pH | Addition Level (lb./ton) | Initial Wet Strength (B.L. - m.) |
|---|---|---|---|
| 21 | 2.5 | 10 | 279 |
| 21 | 2.5 | 20 | 409 |
| 21 | 5.0 | 10 | 82 |
| 21 | 5.0 | 20 | 287 |
| 22 | 2.5 | 10 | 231 |
| 22 | 2.5 | 20 | 370 |
| 22 | 5.0 | 10 | 91 |
| 22 | 5.0 | 20 | 279 |
| 23 | 2.5 | 10 | 251 |
| 23 | 2.5 | 20 | 413 |
| 23 | 5.0 | 10 | 97 |
| 23 | 5.0 | 20 | 294 |
| Control (Cationic Starch Base) | 5.0 | 20 | 89 |

The results show that the wet strength was much higher for starch acetal derivatives cooked at pH 2.5 rather than pH 5.0. At the higher addition level the wet strength increased even for the derivatives cooked at the higher pH. This shows aldehydes were generated at the higher pH.

EXAMPLE XI

This example describes the temporary wet strength provided by the cationic aldehydes. The aldehydes were evaluated for both tissue/towelling applications (Part A) and board and bag applications (Part B).

Part A

The derivatives evaluated were the aldehydes prepared from a cationic waxy corn starch acetal similar to the derivative of Example I-Part A-1 and the cationic cellulose acetal Example V. One starch aldehyde was cooked as in Example VIII, but at a pH of 7, to provide a liquid starch acetal. The acetal was then hydrolyzed to the aldehyde by adjusting the pH to 2.5 and then heating at 90°–100° C. for 10–15 min. It was then added to the paper furnish. The other starch aldehyde was prepared by cooking the acetal at pH 2.5.

One cationic cellulose acetal was cooked as above at pH 7 to provide a liquid cellulose acetal. It was then hydrolyzed to the aldehyde by adjusting the pH to 2.5 and cooked as above. The other cellulose acetal was cooked at pH 2.5. For comparison, the cationic starch base, as well as cationic starch acetal which had been cooked at a pH of 7 but not hydrolyzed, were evaluated (see Table II).

The addition level was 20 lb./ton. The furnish was a 50:50 bleached sulfite:bleached Kraft. The paper sheets were prepared on the Noble and Wood Sheet Mold. The paper weight was about 5 lb./1000 sq. ft. The wet and dry strength results are shown in Table III.

The results show that all the cationic derivatives improved the dr strength with the cationic starch aldehyde providing the most improvement. Only the cationic aldehydes improved the wet strength. The starch aldehyde prepared by simultaneously cooking and hydrolzing the acetal was better than the precooked and subsequently hydrolyzed acetal in dry strength, initial wet strength, and temporary wet strength.

TABLE III

| Sample | Dry Strength (B.L. in m.) | Wet Strength (B.L. in m.) | | | % Relative Wet Strength* | | |
|---|---|---|---|---|---|---|---|
| | | Initial | 30 Min. | 16 Hr. | Initial | 30 Min. | 16 Hr. |
| Blank | 1210 | 49 | 20 | 33 | 4.1 | 1.7 | 2.7 |
| Cationic Starch Base | 1640 | 83 | 43 | N.D. | 5.1 | 2.6 | 2.1 |
| Cationic Starch Acetal (comparative) | 1530 | 71 | 51 | 32 | 4.7 | 3.3 | 2.1 |
| Cationic Starch Aldehyde (cooked at pH 2.5) | 2140 | 382 | 260 | 122 | 17.9 | 12.1 | 5.7 |
| Cationic Starch Aldehyde (precooked acetal) | 1830 | 296 | 217 | N.D. | 16.2 | 11.9 | N.D |
| Cationic Cellulose Aldehyde | 1550 | 335 | 258 | N.D. | 21.6 | 16.6 | N.D |
| Cationic Cellulose Aldehyde (precooked acetal) | 1610 | 350 | 277 | N.D. | 21.7 | 17.2 | N.D. |

*Wet Strength/Dry Strength × 100.
N.D. - Not determined.

Part B

Some of the derivatives were also evaluated at 20 lb./ton in a furnish of 100% unbleached Kraft containing 3% alum (i.e., aluminum sulfate). The paper weight was about 42 lb./1000 sq. ft. The results are shown in Table IV.

The results again show that all the cationic derivatives improved the dry strength with the cellulose aldehydes being the best. Only the aldehydes provided wet strength.

TABLE IV

| Sample | Dry Strength (B.L. in m.) | Wet Strength (B.L. in m.) | | | % Relative Wet Strength | | |
|---|---|---|---|---|---|---|---|
| | | Initial | 30 Min. | 16 Hr. | Initial | 30 Min. | 16 Hr. |
| Blank | 5330 | 516 | 455 | 360 | 9.7 | 8.5 | 6.8 |
| Cationic Starch Base | 6050 | 533 | 471 | N.D. | 8.8 | 7.8 | N.D. |
| Cationic Starch Acetal | 5720 | 507 | 404 | N.D. | 8.9 | 7.1 | N.D. |
| Cationic Starch Aldehyde (cooked at pH 2.5) | 5711 | 1100 | 746 | 637 | 19.3 | 13.1 | 11.2 |
| Cationic Cellulose Aldehyde | 6710 | 1660 | 1400 | 1160 | 24.7 | 20.9 | 17.3 |
| Cationic Cellulose Aldehyde (precooked acetal) | 6160 | 1640 | 1420 | N.D. | 26.6 | 23.1 | N.D. |

In summary, the present invention is seen to provide polysaccharide aldehydes, which are generally useful for imparting strength to paper, as well as the corresponding acetals used in the preparation of the aldehydes. It further provides a non-oxidative method for introducing aldehyde groups into polysaccharides.

Now that the preferred embodiments of the invention have been described in detail, various modifications and improvements thereon will become readily apparent to those skilled in the art. Accordingly, the spirit and scope of the present invention are to be limited only by the appended claims and not by the foregoing specification.

What is claimed is:

1. In a method for making paper having dry strength, wet strength, temporary wet strength, or combinations thereof, the step which comprises adding, as a strength aid, to the stock at any stage prior to forming a web, an effective amount of an aldehyde-containing polysaccharide having the general structure

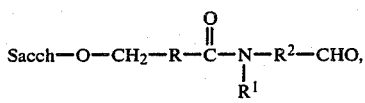

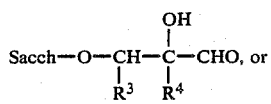

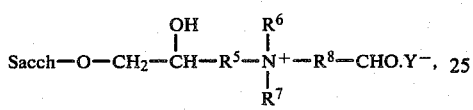

wherein Sacch—O— represents a polysaccharide molecule; R is $(CH_2)_n$, with n being 0 or greater; $R^1$, $R^6$, and $R^7$ are independently hydrogen or an alkyl, aryl, aralkyl, or alkaryl group; $R^2$, $R^5$ and $R^8$ are independently $(CH_2)_m$ with m being 1-6; $R^3$ is hydrogen or a lower alkyl group; $R_4$ is hydrogen or an alkyl, aryl, aralkyl, or alkaryl group; and $Y^-$ is an anion.

2. In the method of claim 1, wherein the derivative contains cationic, cationic and anionic, or zwitterionic groups.

3. In the method of claim 2, wherein the derivative contains, as the cationic groups, diethylaminoethyl ether groups or 3-(trimethyl ammonium chloride)-2-hydroxypropyl ether groups.

4. A paper containing, as a strength aid, an effective amount of an aldehyde-containing polysaccharide having the general structure

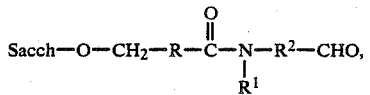

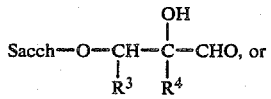

-continued

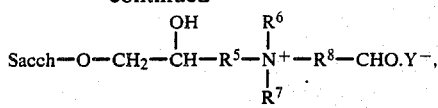

wherein Sacch—O— represents a a polysaccharide molecule; R is $(CH_2)_n$, with n being 0 or greater; $R^1$, $R^6$, and $R^7$ are independently hydrogen or an alkyl, aryl, aralkyl, or alkaryl group; $R^2$, $R^5$ and $R^8$ are independently $(CH_2)_m$ with m being 1-6; $R^3$ is hydrogen or a lower alkyl group; $R^4$ is hydrogen or an alkyl, aryl, aralkyl, or alkaryl group; and $Y^{31}$ is an anion.

5. In the method of claim 1, wherein the polysaccharide is a starch, a gum, or a cellulose derivative.

6. In the method of claim 5, wherein the starch is a waxy maize, corn, high amylose corn, potato, rice, sweet potato, or tapioca starch; $R^1$, $R^6$, and $R^7$ are independently hydrogen or a methyl group; m is 1; $R^3$ and $R^4$ are hydrogen; and $Y^-$ is a chloride, sulfate, or nitrate anion.

7. In the method of claim 1, wherein the derivative is added in an amount from about 0.1 to 10% by weight, based on the weight of the dry pulp.

8. In the method of claim 1, wherein n is 1; m is 1; $R^1$ is hydrogen or methyl; $R^3$ and $R^4$ are hydrogen; and $R^6$ and $R^7$ are methyl.

9. The paper of claim 4, wherein the polysaccharide is a starch, a gum, or a cellulose derivative.

10. The paper of claim 9, wherein the starch is a waxy maize, corn, high amylose corn, potato, rice, sweet potato, or tapioca starch; $R^1$, $R^6$, and $R^7$ are independently hydrogen or a methyl group; m is 1; $R^3$ and $R^4$ are hydrogen; and $Y^-$ is a chloride, sulfate, or nitrate anion.

11. The paper of claim 10, wherein the starch derivative contains one or more cationic, anionic, nonionic or zwitterionic groups.

12. The paper of claim 11, wherein the derivative contains, as the cationic groups, diethylaminoethyl ether groups or 3-(trimethylammonium chloride)-2-hydroxypropyl ether groups.

13. The paper of claim 4, wherein the derivative is added in an amount from about 0.1 to 10% by weight, based on the weight of dry pulp.

14. The paper of claim 4, wherein n is 1; m is 1; $R^1$ is hydrogen or methyl; $R^3$ and $R^4$ are hydrogen; and $R^6$ and $R^7$ are methyl.

15. The paper of claim 4, wherein the paper has dry strength.

16. The paper of claim 4, wherein the paper has wet strength and/or temporary wet strength.

17. The paper of claim 15, wherein the paper has wet strength.

18. The paper of claim 15, wherein the paper has temporary wet strength.

* * * * *